United States Patent Office 3,387,019
Patented June 4, 1968

3,387,019
N-ACYL-N-CYANOALKYL-CYCLOHEXYLAMINES
Alexander Gaydasch, Chicago, Ill., assignor to Universal Oil Products Company, Des Plaines, Ill., a corporation of Delaware
No Drawing. Filed Dec. 1, 1965, Ser. No. 510,954
3 Claims. (Cl. 260—464)

This application relates to a novel composition of matter comprising an N-acyl-N-cyanoalkyl-cyclohexylamine, as well as to the use thereof.

The novel composition of matter is illustrated by the following general formula:

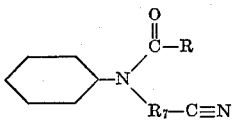

where R is hydrogen or alkyl and R' is alkyl.

In a preferred embodiment R is hydrogen or an alkyl containing from 1 to about 20 carbon atoms and more particularly from 1 to about 10 carbon atoms, and R' is an alkyl group containing from 1 to about 20 carbon atoms and more particularly from 1 to about 10 carbon atoms.

It is understood that the cyclohexyl nucleus may contain hydrocarbon groups attached thereto. In this embodiment the hydrocarbon group preferably comprises an alkyl group which may be in the position 2, 3, or 4 to the nitrogen atom. In another embodiment two or more alkyl groups may be positioned on the cyclohexyl nucleus. In still another embodiment, halogen and particularly chlorine and/or bromine may be attached to the cyclohexyl nucleus.

A particularly preferred compound is N-formyl-N-beta-cyanoethyl-cyclohexylamine. Other compounds include N-acetyl-cyanoethyl-cyclohexylamine,
N-propionyl-N-cyanoethyl-cyclohexylamine,
N-butyryl-N-cyanoethyl-cyclohexylamine,
N-valeryl-N-cyanoethyl-cyclohexylamine,
N-caproyl-N-cyanoethyl-cyclohexylamine,
N-heptanoyl-N-cyanoethyl-cyclohexylamine,
N-octanoyl-N-cyanoethyl-cyclohexylamine,
N-nonanoyl-N-cyanoethyl-cyclohexylamine,
N-decanoyl-N-cyanoethyl-cyclohexylamine, etc., and corresponding N-acyl derivatives in which the cyanoalkyl group contains from 1 to about 20 carbon atoms.

Other specific compounds are illustrated by

N-formyl-N-cyanomethyl-cyclohexylamine,
N-formyl-N-cyanopropyl-cyclohexylamine,
N-formyl-N-cyanobutyl-cyclohexylamine,
N-formyl-N-cyanopentyl-cyclohexylamine,
N-formyl-N-cyanohexyl-cyclohexylamine,
N-formyl-N-cyanoheptyl-cyclohexylamine,
N-formyl-N-cyanooctyl-cyclohexylamine,
N-formyl-N-cyanononyl-cyclohexylamine,
N-formyl-N-cyanodecyl-cyclohexylamine, etc., and corresponding N-cyanoalkyl derivatives in which the acyl group contains from 2 to about 20 carbon atoms.

The novel compounds of the present invention are prepared in any suitable manner. In a preferred method cyclohexylamine is first reacted to form the N-cyanoalkyl-cyclohexylamine. This reaction is readily effected at low temperature, generally room temperature and usually not above about 150° C., and either in the presence or absence of a catalyst. When employed any suitable catalyst may be used and may be basic or acidic. Illustrative catalysts include quarternary ammonium hydroxides and particularly benzyltrimethyl ammonium hydroxide; metal borates and particularly sodium meta borate; acetic acid, propionic acid, etc. When desired the reaction may be effected in the presence of a solvent and any suitable solvent may be employed. Illustrative solvents include dioxane, aromatic hydrocarbons, paraffinic hydrocarbons, etc.

The preparation of the N-cyanoalkyl-cyclohexylamine generally is effected by reacting cyclohexylamine with a nitrile. The nitrile will be selected with reference to the number of carbon atoms desired in the R' group of the formula hereinbefore set forth. Illustrative nitriles include acrylonitrile, methacrylonitrile, crotononitrile, chloroacetonitrile, chloropropionitrile, chlorobutyronitrile, chlorolauronitrile, chlorosteareonitrile, glycolonitrile, acetone cyanohydrin, ethylene cyanohydrin, etc. Generally equal mole proportions of cyclohexylamine and nitrile are employed, although a slight excess of up to 1.5 mole proportion of nitrile per mole of cyclohexylamine may be employed to advantage. However, a greater excess of the nitrile should not be utilized in order to avoid formation of the dicyanoalkyl-cyclohexylamine.

The N-cyanoalkyl-cyclohexylamine, prepared in the above manner or obtained from any suitable source, is then reacted to form an N-acyl derivative. This reaction is readily effected by reacting the N-cyanoalkyl-cyclohexylamine with a carboxylic acid, often in the presence of a catalyst, an acid anhydride, or acid halide. The carboxylic acid will be selected with reference to the chain length desired in the R group of the formula hereinbefore set forth. Illustrative acids include formic acid, acetic acid, propionic acid, butyric acid, isobutyric acid, valeric acid, trimethylacetic acid, caproic acid, heptylic acid, caprylic acid, pelargonic acid, etc. When desired the reaction is effected in the presence of a suitable solvent, which preferably is an aromatic hydrocarbon including benzene, toluene, ethylbenzene, xylene, cumene, etc.

The reaction of the N-cyanoalkyl-cyclohexylamine with the carboxylic acid is readily effected by refluxing the mixture preferably in the presence of a solvent. The temperature of refluxing will depend upon the particular solvent employed. For example, when benzene is the solvent, the temperature will be about 80° C.; with toluene as the solvent, the temperature will be about 110° C.; with xylene as the solvent, the temperature will be about 140° C., etc. The N-cyanoalkyl-cyclohexylamine and acid are reacted in equal mole proportions. Preferably a slight excess of acid up to two mole proportions of acid per one mole proportion of N-cyanoalkyl-cyclohexylamine, is used in order to insure complete reaction. In a preferred embodiment the water formed in the reaction is liberated and removed during the refluxing, after which the product may be recovered as a solution in the solvent or, when desired, the solvent may be removed by distillation under vacuum and the N-acyl-cyanoalkyl-cyclohexylamine is recovered as a solid product. While the method set forth above generally is preferred, it is understood that the reverse procedure may be employed; namely, first preparing the acyl derivative and then preparing the cyanoalkyl derivative.

The novel compounds of the present invention will possess various utility. In one embodiment these compounds are utilized for the stabilization of organic substances which undergo deterioration primarily due to ultraviolet light absorption.

In one embodiment the compounds of the present invention are used as a stabilizer in plastics. One type of plastic is a polyolefin including polyethylene, polypropylene, polybutylene, mixed ethylene-propylene polymers, mixed ethylene-butylene polymers, mixed ethylene-propylene-butylene polymers, etc. The solid olefin polymers are used in many applications including electrical insulation, light-weight outdoor furniture, awnings, fibers, etc.

Another plastic is polystyrene, which is particularly useful in the manufacture of molded or machined articles. Still another class of plastics is vinyl resin which is derived from monomers such as vinyl chloride, vinyl acetate, vinylidene chloride, etc., such plastics including polyvinyl chloride, copolymers of vinyl chloride with acryonitrile, methacrylonitrile, vinylidine chloride, alkyl acrylates, alkyl methacrylates, alkyl maleates, alkyl fumarates, polyvinyl butyryl, etc., or mixtures thereof. Still other plastics include polycarbonates, phenol-formaldehyde resins, urea-formaldehyde resins, melamine-formaldehyde resins, acryloid plastics, polyacetals, linear or cross-linked polyesters, etc. Still other plastics are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), saran (copolymer of vinylidine chloride and vinyl chloride), rayon, etc.

In another embodiment of the present invention the organic substance to be stabilized is a paint, coating, etc. which is exposed to ultraviolet absorption. In still another embodiment the organic substance to be stabilized is rubber. Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna A (copolymer of butadiene and acrylonitrile), butyl rubber (copolymer of butadiene and isobutylene), neoprene rubber (chloroprene polymer), Thiokol rubber (polysulfide), silicone rubber, etc. The natural rubbers include hevea rubber, cautchouc, balata, gutta percha, etc. Rubber is exposed to direct sunlight for extended periods of time and undergoes deterioration from this source.

The above are illustrative examples of organic substances which undergo deterioration due to ultraviolet absorption. It is understood that the novel process of the present invention also may be used with other organic substances which undergo such deterioration.

As hereinbefore set forth, the composition of matter of the present invention generally is recovered as a solid and may be utilized as such or dissolved in a suitable solvent. Any suitable solvent may be used and will be one which will be satisfactory for use in the organic substance to be stabilized.

The additive of the present invention is incorporated in the organic substance in a concentration sufficient to effect the desired stabilization. The specific concentration will depend upon the particular organic substance being stabilized and thus the concentration may be within the range of from about 0.001% to about 25% by weight of the organic substance. In most cases, however, the concentration will be within the range of from about 0.01% to about 5% by weight of the organic substance.

In many applications it may be advantageous to utilize the additive of the present invention in conjunction with other additives. For example, in the stabilization of plastics, a phenolic antioxidant, particularly 2,6-di-tert-butyl-4-methyl phenol or 2,4-dimethyl-6-tertiary-butyl phenol, may be used. Other phenolic inhibitors or amino type inhibitors also may be used.

The additive of the present invention is incorporated in the organic substance in any suitable manner and, when desired, may be premixed with the other additive or additives and the mixture added to the organic substance in one step. When the additive or mixture is to be incorporated into a plastic, resin or the like, it may be added to the hot melt, with stirring, generally in a Banbury mixer, extruder or other device. Incorporation of the additive in a liquid preferably is accompanied by intimate mixing to effect distribution of the additive throughout the liquid. When the additive is added to a multicomponent mixture, it may be added to one of the components and, in this manner, incorporated into the final mixture or it may be added directly into the final mix.

The following examples are introduced to illustrate further the novelty and utility of the present invention but not with the intention of unduly limiting the same.

Example I

The compound of this example is N-formyl-N-beta-cyanoethyl-cyclohexylamine and was prepared as follows: The beta-cyanoethyl-cyclohexylamine used as a reactant was obtained commercially. A mixture of 304 g. (2 moles) of beta-cyanoethyl-cyclohexylamine, about 150 g. (3 moles) of 95% formic acid and 300 g. of xylene was slowly distilled. The water liberated in the reaction was distilled overhead and 77 cc. of water was collected. Continued distillation resulted in xylene being removed overhead. When 200 cc. of the xylene was recovered in the overhead, the distillation was continued at a reduced pressure of 14 mm. Hg. This was resulted in the recovery of 366 g. of a dry amber oil which crystallized rapidly. A portion of the crystals was recrystallized from hot cyclohexane. N-formyl-N-beta-cyanoethyl-cyclohexylamine was recovered as white crystals. The crystals had a melting point of 66° C. and were soluble in ether, benzene, methanol, acetone and ethyl acetate.

Example II

The compound of this example is N-acetyl-N-beta-cyanoethyl-cyclohexylamine. It was prepared in substantially the same manner as described in Example I, by heating and refluxing for three hours two mole proportions of N-beta-cyanoethyl-cyclohexylamine and three mole proportions of acetic acid in the presence of xylene solvent. The water liberated in the reaction is removed overhead to leave a solution of the N-acetyl-N-beta-cyanoethyl-cyclohexylamine in xylene, which solution can be utilized as an additive. A solid matter obtained upon removal of xylene solvent was recrystallized from benzene-cyclohexane mixture to produce crystals melting at 80°. Yield was at least 80% of theory.

Example III

N-butyryl-N-cyanobutyl-cyclohexylamine is prepared by reacting two mole proportions of N-cyanobutyl-cyclohexylamine and three mole proportions of butyric acid in xylene in the presence of acid resin as a catalyst. The water formed the reaction is removed during refluxing, after which the xylene solvent is removed by vacuum distillation. N-butyryl-N-cyanobutyl-cyclohexylamine is recovered as solid crystals.

Example IV

As hereinbefore set forth the compounds of the present invention are particularly useful as additives in polyolefins to prevent deterioration due to ultraviolet absorption. The present example reports evaluations made in a solid polypropylene. The solid polypropylene without inhibitor was stated to have properties substantially as follows:

Table I

| | |
|---|---|
| Specific gravity | 0.910–0.920 |
| Refractive index, $n_D^{25}$ | 1.510 |
| Heat distortion temperature: | |
| At 66 p.s.i. load, ° C. | 116 |
| At 264 p.s.i. load, ° C. | 66 |
| Tensile yield strength, p.s.i. (ASTM D–638–58T) (0.2 per min.) | 4700 |
| Total elongation, percent | 300–400 |
| Stiffness flexural (ASTM D747–50) 105 p.s.i. | 1.8 |
| Shore hardness (ASTM D676–55T) | 74D |

The additives when employed were incorporated into the different samples of the polypropylene by milling.

Samples of the polypropylene, with and without additive, were exposed outdoors, after which the physical properties were determined in Instron Universal tester. The polypropylene samples were cut into dumb-bell specimens (3.876" long and 0.625" wide with the neck being 0.86" long, 0.312" wide and 0.017" thick). In the Instron Universal tester, the dumb-bell specimen is gripped firmly at the top and bottom. A constant pull of 2" per minute is exerted downwardly and the following data were obtained: (1) The percent elongation until rupture occurs and (2) the yield strength, which is the point at which the sample loses its resistance to permanent deformation. In most cases, the yield strength is equivalent to the tensile strength which is the pounds per square inch of force at which rupture occurs.

The following table reports the results of such evaluations for (1) a sample of the polypropylene without additive and (2) a sample of the polypropylene containing 1% by weight of N-formyl-N-beta-cyanoethyl-cyclohexylamine, prepared as described in Example I, and 0.15% by weight of 2,6-di-tertiary-butyl-4-methyl phenol. The results of these evaluations are reported in the following table, which also reports the initial physical properties of the polypropylene.

TABLE II

| Additive | Initial Physical Properties | | After Exposure Outdoors | | |
|---|---|---|---|---|---|
| | Elongation, percent | Yield Strength, p.s.i. | Days | Elongation, percent | Yield Strength, p.s.i. |
| None | 420 | 4,700 | 8 | 3.6 | 1,664 |
| 1% N-formyl-N-beta-cyanoethylcyclohexylamine and 0.15% butylated hydroxy toluene | 520 | 4,500 | 61 | 15 | 4,600 |

From the data in the above table it will be seen that the control sample (not containing the additive) lost practically all of its desirable physical properties after about 8 days of outdoor exposure. In contrast, the sample of polypropylene containing the additive of the present invention still retained a considerable portion of these desired physical properties after 61 days of outdoor exposure.

Example V

The plastic of this example is solid polyethylene of the high density type. An inhibited product of this polyethylene is marketed commercially under the trade name of "Fortiflex" by the Celanese Corporation of America. A batch of this polyethylene free of inhibitor is pressed into sheets of about 17 mil. thickness and cut into plaques of about 1⅜" x 1½". When employed, the additive is incorporated in the polyethylene prior to pressing into sheets. The different samples are evaluated in the weatherometer. The plaques are inserted into plastic holders, affixed onto a rotating drum and exposed to carbon arc rays at about 52° C. in the weatherometer. The samples are examined periodically by infrared analysis to determine the carbonyl band at 1715 cm.$^{-1}$ which is reported as the "carbonyl number." The higher intensity of the carbonyl band indicates a higher carbonyl concentration (expressed as carbonyl number) and accordingly decreased deterioration.

A sample of the polyethylene without inhibitor when evaluated in the weatherometer increases from a carbonyl number of 28 to a carbonyl number of 855 within 624 hours. In contrast, another sample of the polyethylene containing 1% by weight of N-formyl-N-beta-cyanoethyl-cyclohexylamine, prepared as described in Example I, does not develop a carbonyl number of 1000 for a considerably longer period of time.

Example VI

N - acetyl - N - beta - cyanoethyl - cyclohexylamine, prepared as described in Example II, is utilized as an inhibitor in polyvinyl chloride plastic. The additive is incorporated by partly melting the polyvinyl chloride plastic and adding the inhibitor into the hot melt in a concentration of 0.75% by weight. This serve to inhibit deterioration of the polyvinyl chloride plastic due to ultraviolet light.

Example VII

N - formyl - N - beta - cyanoethyl - cyclohexylamine, prepared as described in Example I, is used as an inhibitor in polystyrene. The inhibitor is incorporated in a concentration of 1% by weight by partly melting the polystyrene and adding the inhibitor to the hot melt. The polystyrene containing the inhibitor is of improved resistance to deterioration by ultraviolet light.

I claim as my invention:
1. N-acyl-N-cyanoalkyl-cyclohexylamine of the following general formula:

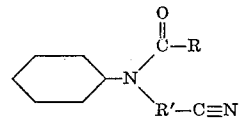

where R is hydrogen or alkyl and R' is alkyl.
2. Claim 1 further characterized in that said compound is N-formyl-N-beta-cyanoethyl-cyclohexylamine.
3. Claim 1 further characterized in that said compound N-acetyl-N-beta-cyanoethyl-cyclohexylamine.

References Cited
FOREIGN PATENTS
516,186  12/1952  Belgium.

CHARLES B. PARKER, *Primary Examiner.*
S. T. LAWRENCE III, *Assistant Examiner.*